No. 670,459. Patented Mar. 26, 1901.
H. SPUNAUGLE.
DRAFT EQUALIZER.
(Application filed Dec. 8, 1900.)
(No Model.) 2 Sheets—Sheet 1.
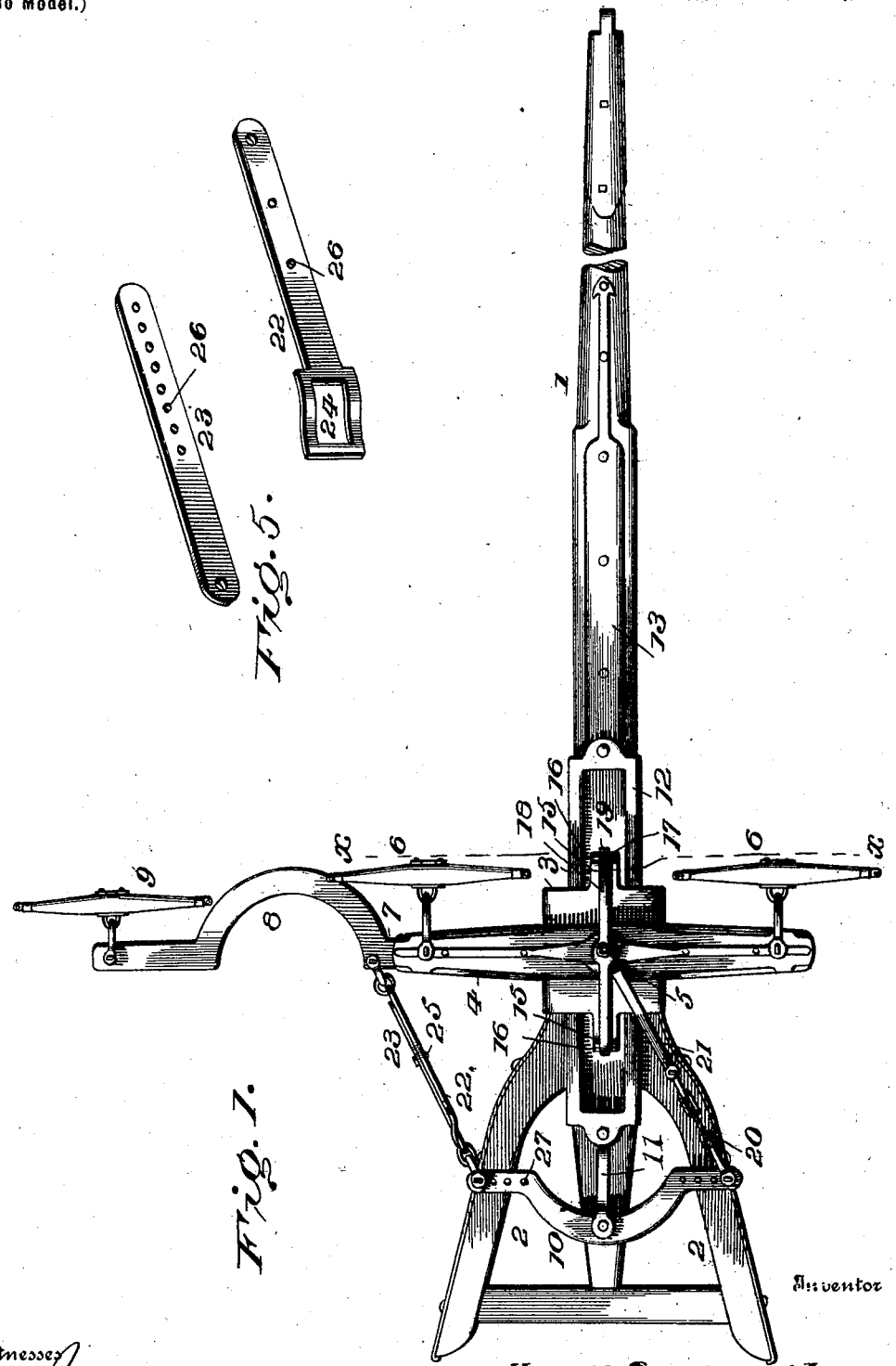

No. 670,459.  
H. SPUNAUGLE.  
DRAFT EQUALIZER.  
(Application filed Dec. 8, 1900.)  
Patented Mar. 26, 1901.

(No Model.)  
2 Sheets—Sheet 2.

Witnesses  
Inventor  
Henry Spunaugle  
By R. S. & A. B. Lacey  
Attorneys

UNITED STATES PATENT OFFICE.

HENRY SPUNAUGLE, OF HAWLEYVILLE, IOWA.

DRAFT-EQUALIZER.

SPECIFICATION forming part of Letters Patent No. 670,459, dated March 26, 1901.

Application filed December 8, 1900. Serial No. 39,206. (No model.)

*To all whom it may concern:*

Be it known that I, HENRY SPUNAUGLE, a citizen of the United States, residing at Hawleyville, in the county of Page and State of Iowa, have invented certain new and useful Improvements in Draft-Equalizers; and I do hereby declare the following to be a full, clear, and exact description of the invention, such as will enable others skilled in the art to which it appertains to make and use the same.

This invention relates to means for equalizing the draft of animals disposed in unequal numbers upon opposite sides of the pole or tongue of a vehicle, farming implement, or agricultural machine.

The invention consists of a slide, a singletree mounted upon the slide and having singletrees at its ends, a lever fulcrumed to the slide and adapted to have draft applied thereto, an equalizing-lever in the rear of the slide, and connections between the said lever and the slide and the draft-lever.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 3:
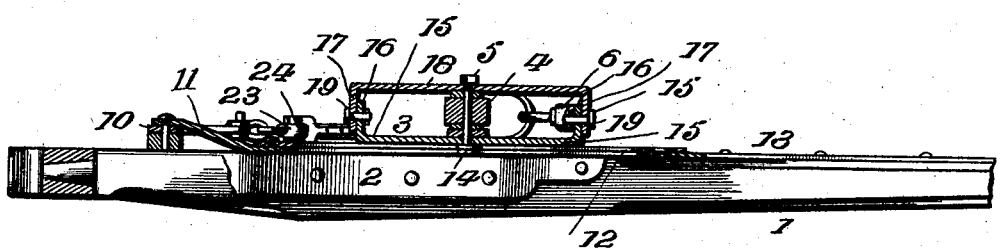
Figure 2:
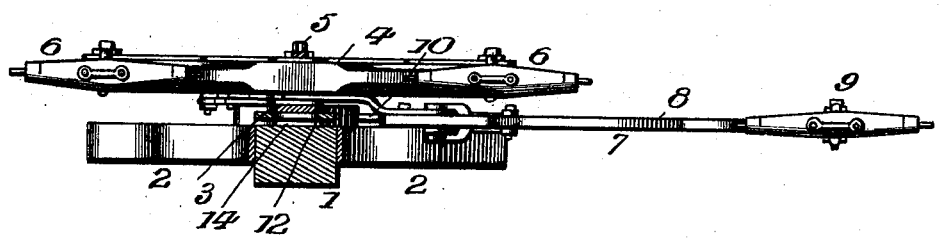
Figure 4:
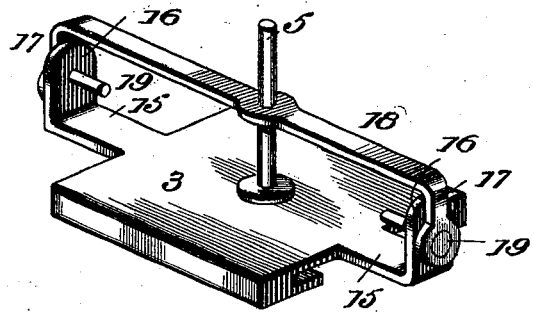

Figure 1 is a top plan view of the invention applied to a pole or tongue. Fig. 2 is a transverse section on the line X X of Fig. 1 looking to the rear. Fig. 3 is a central longitudinal section, the pole being in full. Fig. 4 is a perspective view of the slide and arch. Fig. 5 is a detail perspective view of the adjustable link, the parts being separated and relatively arranged in the position which they occupy when assembled.

Corresponding and like parts are referred to in the following description and indicated in all the views of the drawings by the same reference characters.

The pole or tongue 1 may be of any make, according to the style of vehicle, machine, or implement to which it is to be applied, and is strengthened by the hounds 2, either of metal or wood, reinforcing-straps being employed and attached to the hounds when the latter are formed of wood, as illustrated. The slide 3 is mounted to move longitudinally upon the pole and is held thereto and directed in its reciprocating movements by any suitably-devised means. A singletree 4 is mounted upon a vertical pin or journal 5, applied centrally to the slide 3, and is provided at its ends with singletrees 6, attached thereto by clevises in the well-known way. A draft-lever 7 is fulcrumed at its inner end to the slide 3, so as to move therewith, and by preference it is mounted upon the pin or journal 5. A curve 8 is formed near the outer end of the draft-lever to prevent contact thereof with the wheel or other portion of the vehicle, implement, or machine to which the equalizing device may be applied. A singletree 9 is applied to the outer end of the draft-lever 7 to enable the animal to be hitched thereto. An equalizing-lever 10 is located in the rear of the slide and is pivoted centrally to the pole 1 and its opposite ends are connected, respectively, to the slide and draft-lever. A hammer-strap 11 braces the upper end of the bolt upon which the equalizing-lever is mounted.

The means for holding and directing the slide in its reciprocating movements consist of an oblong plate 12, secured to the pole 1 and spaced therefrom. This plate 12 is slotted for the sake of lightness and economy in metal and is spaced from the pole at its rear end by means of the hammer-strap 11 and at its front end by a reinforcing-strap 13, made fast to the pole, and at an intermediate point by means of a washer 14. The slide 3 has its longitudinal edge portions constructed to embrace the longitudinal edges of the plate 12, so as to retain the slide in place and give proper direction thereto in its longitudinal movements. Arms 15 are provided centrally of the slide 3 and extend in opposite directions from the front and rear ends thereof, and their terminal portions are bent about at a right angle, as shown at 16, to receive the bent ends 17 of a bar 18, constituting the arch and centrally apertured to receive the upper portion of the pin or journal 5. The bent ends 16 and 17 overlap and are connected by bolts 19, passing through openings in coincident relation therein.

One end of the equalizing-lever 10 is connected with the slide by means of a short chain 20 and link 21, the end of the link being widened and pierced to receive the pin or journal 5. The opposite end of the equalizing-lever is connected with the draft-lever 7 by means of an adjustable link composed of members 22 and 23, the member 22 having a loop 24 at one end, through which the member 23 slides, and both members being adjustably connected by means of a fastening 25, adapted to pass through one of a series of openings 26 in the member 23 and make screw-thread connection with the loop of the member 22. The end portions of the equalizing-lever 10 are formed with a series of openings 27, which enable adjustable connection therewith of the connections between said lever and the parts 3 and 7.

The pivotal end of the draft-lever 7 is capable of longitudinal movement with the slide 3 and a turning movement with reference to the connection between it and the equalizing-lever, and as a result the device is sensitive and responsive, so as to insure an equalization of the load upon the team, which is of material advantage in distributing the work upon the several draft-animals.

Having thus described the invention, what is claimed as new is—

1. In a draft-equalizer, a slide mounted for longitudinal movement and bearing a singletree, a draft-lever fulcrumed to the slide and movable therewith, an equalizing-lever, and connections between opposite ends of the equalizing-lever and said slide and draft-lever, substantially as set forth.

2. In a draft-equalizer, a longitudinally-movable slide, a singletree, a draft-lever, a pin or analogous fastening connecting the singletree and draft-lever with the said slide, an equalizing-lever located in the rear of the slide, and connections between the ends of the equalizing-lever and the said slide and draft-lever, substantially as specified.

3. In a draft-equalizer, a longitudinally-movable slide having front and rear arms formed with bent ends, a pin or journal secured to the slide, an arch centrally pierced for the passage of the said pin and having its ends attached to the bent end of the aforesaid arms, a singletree, a draft-lever mounted upon the pin between the slide and arch, an equalizing-lever, and connections between the ends of the equalizing-lever and the slide and draft-lever, substantially as specified.

4. In a draft-equalizer, a longitudinal slide, a pin applied to said slide, a singletree, and a draft-lever mounted upon said pin, an equalizing-lever in connection between one end of the equalizing-lever and the draft-lever, and a second connection between the equalizing-lever and the slide and including a link, the latter mounted upon the pin of the slide and free to move on the latter, substantially as specified.

5. In combination, a plate secured to the pole and spaced therefrom, a slide having its edge portions constructed to embrace the edge portions of the said plate, a singletree, a draft-lever fulcrumed to said slide and equalizing-lever, and connections between the ends of the equalizing-lever and the said slide and draft-lever, substantially as specified.

In testimony whereof I affix my signature in presence of two witnesses.

HENRY ✕ SPUNAUGLE. [L. S]
his mark

Witnesses:
CHARLES E. BLAIR,
WILLIAM J. SPUNAUGLE.